(12) United States Patent
Malinowski

(10) Patent No.: US 11,975,521 B2
(45) Date of Patent: *May 7, 2024

(54) ROLL-UP THERMAL BARRIER

(71) Applicant: Rytec Corporation, Jackson, WI (US)

(72) Inventor: Jeffrey Thomas Malinowski, Hartford, WI (US)

(73) Assignee: RYTEC CORPORATION, Jackson, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/085,740

(22) Filed: Dec. 21, 2022

(65) Prior Publication Data

US 2023/0150228 A1 May 18, 2023

Related U.S. Application Data

(63) Continuation of application No. 14/134,698, filed on Dec. 19, 2013, now Pat. No. 11,548,263.

(Continued)

(51) Int. Cl.
*B32B 5/02* (2006.01)
*B32B 5/18* (2006.01)
(Continued)

(52) U.S. Cl.
CPC ............... *B32B 5/02* (2013.01); *B32B 5/028* (2013.01); *B32B 5/18* (2013.01); *B32B 5/245* (2013.01);
(Continued)

(58) Field of Classification Search
CPC .. B32B 5/02; B32B 5/18; B32B 27/34; B32B 7/08; B32B 27/32; B32B 5/245;
(Continued)

(56) References Cited

U.S. PATENT DOCUMENTS 3,697,126 A 10/1972 Tiffin et al.
3,724,526 A 4/1973 Huprich
(Continued)

FOREIGN PATENT DOCUMENTS

EP 0 358 920 3/1990
JP H11-310990 11/1999
(Continued)

OTHER PUBLICATIONS

Polymer Insulation Products, Insulation Values: Units of measurement and relationship between parameters, Article, Jun. 14, 2016, retrieved from Internet: URL: HTTP://WWW.piproducts.eu/files/insulation, retrieved on Jun. 14, 2016.
(Continued)

*Primary Examiner* — Elizabeth M Imani
(74) *Attorney, Agent, or Firm* — SCHROEDER INTELLECTUAL PROPERTY LAW GROUP, LLC

(57) ABSTRACT

A thermal barrier configured to be rolled and unrolled while providing a thermal value of greater than about R=3. The thermal barrier comprises multiple layers including a first layer comprising a fiber mesh core and material selected from the group comprising: polyurethane, rubber, and polyvinylchloride, a second layer bonded to the first layer, the second layer comprising material selected from the group comprising: polyolefin foam, polyurethane foam and rubber based foam, and a third layer bonded to the second layer, the third layer comprising a thin film or fabric material selected from the group comprising: polyester, polyolefin, polyurethane and nylon, wherein the first layer has a greater length along the linear dimension than the second layer and the third layer.

16 Claims, 3 Drawing Sheets

Related U.S. Application Data

(60) Provisional application No. 61/740,877, filed on Dec. 21, 2012.

(51) Int. Cl.
*B32B 5/24* (2006.01)
*B32B 7/12* (2006.01)
*B32B 25/02* (2006.01)
*B32B 25/04* (2006.01)
*B32B 27/06* (2006.01)
*B32B 27/30* (2006.01)
*B32B 27/32* (2006.01)
*B32B 27/34* (2006.01)
*B32B 27/36* (2006.01)
*B32B 27/40* (2006.01)
*E06B 3/80* (2006.01)
*E06B 9/13* (2006.01)
*E06B 9/40* (2006.01)

(52) U.S. Cl.
CPC ............... *B32B 7/12* (2013.01); *B32B 25/02* (2013.01); *B32B 25/045* (2013.01); *B32B 27/065* (2013.01); *B32B 27/304* (2013.01); *B32B 27/32* (2013.01); *B32B 27/34* (2013.01); *B32B 27/36* (2013.01); *B32B 27/40* (2013.01); *E06B 3/80* (2013.01); *E06B 9/13* (2013.01); *E06B 9/40* (2013.01); *B32B 2260/02* (2013.01); *B32B 2260/046* (2013.01); *B32B 2260/048* (2013.01); *B32B 2262/0253* (2013.01); *B32B 2262/0261* (2013.01); *B32B 2262/0276* (2013.01); *B32B 2266/0207* (2013.01); *B32B 2266/025* (2013.01); *B32B 2266/0278* (2013.01); *B32B 2266/08* (2013.01); *B32B 2307/304* (2013.01); *B32B 2307/546* (2013.01); *B32B 2307/734* (2013.01); *B32B 2607/02* (2013.01); *Y10T 156/10* (2015.01); *Y10T 442/10* (2015.04)

(58) Field of Classification Search
CPC ....... B32B 5/028; B32B 27/36; B32B 27/065; B32B 7/12; B32B 25/045; B32B 25/02; B32B 27/40; B32B 27/304; B32B 2262/0253; B32B 2266/0207; B32B 2262/0261; B32B 2266/025; B32B 2307/304; B32B 2262/0276; B32B 2266/0278; B32B 2307/734; B32B 2260/02; B32B 2260/048; B32B 2307/546; B32B 2607/02; B32B 2260/046; B32B 2266/08; E06B 3/80; E06B 9/13; E06B 9/40; Y10T 442/10; Y10T 156/10

See application file for complete search history.

(56) References Cited

U.S. PATENT DOCUMENTS

| | | | |
|---|---|---|---|
| 3,862,291 | A | 1/1975 | Brandon, Jr. et al. |
| 3,878,879 | A | 4/1975 | Manns |
| 4,037,639 | A | 7/1977 | Jones |
| 4,137,575 | A | 2/1979 | Klaffke et al. |
| 4,183,393 | A | 1/1980 | Bailey |
| 4,234,973 | A | 11/1980 | Vetter |
| 4,445,958 | A | 5/1984 | Jaksha |
| 4,495,977 | A | 1/1985 | Delluc |
| 4,696,324 | A | 9/1987 | Petronko |
| 4,784,891 | A | 11/1988 | Shickel |
| 4,929,497 | A | 5/1990 | Mitchell et al. |
| 4,934,437 | A | 6/1990 | Kraeutler |
| 5,125,196 | A | 6/1992 | Moody |
| 5,219,015 | A | 6/1993 | Kraeutler |
| 5,265,662 | A | 11/1993 | Hirao et al. |
| 5,365,990 | A | 11/1994 | Ueda |
| 5,372,173 | A | 12/1994 | Horner |
| 5,512,319 | A | 4/1996 | Cook et al. |
| 5,544,690 | A | 8/1996 | Magro et al. |
| 5,549,776 | A | 8/1996 | Juriga |
| 5,622,662 | A | 8/1997 | Veiga et al. |
| 5,981,020 | A * | 11/1999 | Sutherland ............... B32B 5/18 428/317.1 |
| 6,419,652 | B1 * | 7/2002 | Slautterback ........... A61F 5/028 2/311 |
| 6,659,158 | B2 | 12/2003 | Laugenbach |
| 6,955,845 | B1 | 10/2005 | Poole et al. |
| 7,111,661 | B2 | 9/2006 | Laugenbach |
| 11,548,263 | B2 | 1/2023 | Malinowski |
| 2003/0066252 | A1 | 4/2003 | Rejc |
| 2008/0174147 | A1 | 7/2008 | Skaradzinski |
| 2009/0142551 | A1 | 6/2009 | Fox et al. |
| 2010/0183841 | A1 | 7/2010 | Mally |
| 2010/0257802 | A1 | 10/2010 | Strickland et al. |
| 2011/0031254 | A1 | 2/2011 | Mortarotti |
| 2011/0268916 | A1 | 11/2011 | Pardue, Jr. |
| 2012/0027982 | A1 | 2/2012 | Lee et al. |
| 2012/0043031 | A1 * | 2/2012 | Leighton .................. E06B 9/13 160/405 |
| 2012/0064320 | A1 | 3/2012 | Deseure et al. |
| 2013/0042532 | A1 | 2/2013 | Aragon et al. |
| 2013/0042983 | A1 * | 2/2013 | Wachtell ................... E06B 5/00 160/327 |

FOREIGN PATENT DOCUMENTS

| | | |
|---|---|---|
| JP | 2012-031931 | 2/2012 |
| KR | 10-2010-0038307 | 4/2010 |
| WO | 2007/146282 | 12/2007 |

OTHER PUBLICATIONS

U.S. Appl. No. 18/418,558, filed Jan. 22, 2024.

* cited by examiner

ROLL-UP THERMAL BARRIER

This application is a continuation of U.S. patent application Ser. No. 14/134,698 filed Dec. 19, 2013, which claims the benefit of and priority to U.S. Provisional Application No. 61/740,877, filed Dec. 21, 2012—the disclosure of both of which is incorporated by reference herein in their entirety.

BACKGROUND

1.0 Field of the Invention

The present disclosure relates to a composite material and, more particularly, a composite material capable of rolling and unrolling from spiral to flat shape while providing substantial insulating value, among other benefits.

2.0 Related Art

Various materials are available that may be used for thermal barriers such as used in buildings, roll-up doors, doors, freezer doors, and similar applications. For applications such as configured as roll-up type doors, many of these thermal barrier products suffer from deficiencies that include cracking of the surfaces, limited insulating properties, need for replacement of the door panels on a regular basis. Moreover, these roll-up type doors often do not perform well in very cold weather, resisting unrolling and/or rolling.

Many thermal barriers are made as a symmetric type construction, where the layers are symmetrically layered in relation to a central layer. For example, a central core layer of strong material may be layered systematically on either side with insulating material such as foam insulation. However, these types of arrangements tend to fail rather quickly when placed into service.

A new composite material that overcomes these deficiencies would have substantial contribution to the thermal barrier industry.

SUMMARY OF THE DISCLOSURE

The disclosure overcomes the shortcomings of the prior art by providing a composition of material suitable for thermal barriers that is configured to be rolled up into a coil and unrolled many times while maintaining structural integrity. The composition of material may be suitable for many applications such as for use in buildings, roll-up doors, doors, freezer doors, and similar applications.

In one aspect, a thermal barrier configured to be rolled and unrolled while providing a thermal value of greater than about R=3 is provided. The thermal barrier comprises multiple layers including a first layer comprising a fiber mesh core and material selected from the group comprising: polyurethane, rubber, and polyvinylchloride, a second layer bonded to the first layer, the second layer comprising at least one of: polyolefin foam, polyurethane foam and rubber based foam, and a third layer bonded to the second layer, the third layer comprising a thin film or fabric material selected from the group comprising: polyester, polyolefin, polyurethane and nylon, wherein the composite material maintains a consistent linear dimension within about 1% of total length in a coiled configuration compared with a linear configuration. The first layer may be bonded to the second layer by acrylic based adhesive, heated fusion, or both. The second layer may be bonded to the third layer by acrylic based adhesive, heated fusion, or both. The first layer may have a thickness of greater than about 0.03" and less than about 0.25". The third layer may have a thickness less than about 25 mil and greater than about 2 mil. The composite material may be resistant to being rolled into a spiral configuration and unrolled from a spiral configuration in a first direction, while being substantially non-resistant to being rolled and unrolled in a second direction. The composite material may have no seams in the first direction. The composite material may be seamless and continuous.

In one aspect, a method of forming a thermal barrier may include the steps of providing a first layer comprising a fiber mesh core and material comprising at least one of: polyurethane, rubber, and polyvinylchloride, bonding a second layer to the first layer, the second layer comprising at least one of: polyolefin foam, polyurethane foam and rubber based foam, and bonding a third layer to the second layer, the third layer comprising a thin film or fabric material selected from the group comprising: polyester, polyolefin, polyurethane and nylon, wherein the composite material maintains a consistent linear dimension within about 1% of total length in a coiled configuration compared with a linear configuration.

In one aspect, a method of forming a thermal barrier may include the steps of bonding a first layer with a second layer, the second layer comprising at least one of: polyolefin foam, polyurethane foam and rubber based foam, the first layer comprising a fiber mesh core and material comprising at least one of: polyurethane, rubber, polyvinylchloride and polyurethane, producing a composite material having a length and a width wherein the composite material maintains a consistent linear dimension within about 1% of a total length in a coiled configuration compared with a linear configuration, the composite material resistant to rolling in the direction of the width.

Additional features, advantages, and embodiments of the invention may be set forth or apparent from consideration of the detailed description and drawings. Moreover, it is to be understood that the foregoing summary of the invention and the following detailed description and drawings are exemplary and intended to provide further explanation without limiting the scope of the invention as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and, together with the detailed description, serve to explain the principles of the disclosure. No attempt is made to show structural details of the disclosure in more detail than may be necessary for a fundamental understanding of the disclosure and the various ways in which it may be practiced. In the drawings.

Figure 1D:
FIG. 1D is a side view of FIG. 1A.

The present disclosure is further described in the detailed description that follows.

DETAILED DESCRIPTION OF THE DISCLOSURE

The disclosure and the various features and advantageous details thereof are explained more fully with reference to the non-limiting examples that are described and/or illustrated in the accompanying drawings and detailed in the following description and attachment. The attachment hereto is incorporated herein by reference in its entirety as part of this disclosure. It should be noted that the features illustrated in the drawings are not necessarily drawn to scale, and features of one example may be employed with other examples as the skilled artisan would recognize, even if not explicitly stated herein. Descriptions of well-known components and processing techniques may be omitted so as to not unnecessarily obscure the examples of the disclosure. The examples used herein are intended merely to facilitate an understanding of ways in which the invention may be practiced and to further enable those of skill in the art to practice the examples of the disclosure. Accordingly, the examples herein should not be construed as limiting the scope of the invention.

The terms "including", "comprising", and variations thereof, as used in this disclosure, mean "including, but not limited to", unless expressly specified otherwise.

The terms "a", "an", and "the", as used in this disclosure, means "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

Figure 1A:
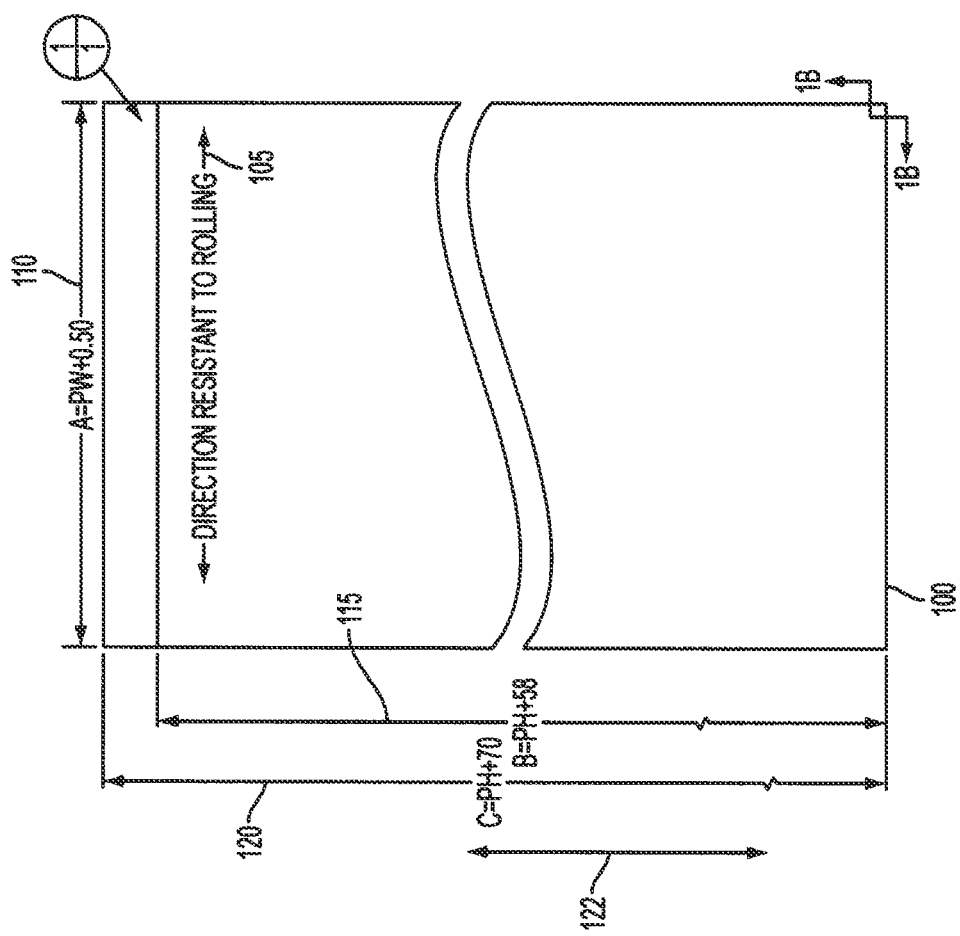
FIG. 1A is a front view of an illustration of a composite material, according to principles of the disclosure.

FIG. 1A is a front view of an illustration of a composite material 100 suitably configured to be rolled and unrolled many times from a flat shape to a spiral or rolled-up shape. The composite material 100 may be configured and sized as needed for use in applications such as roll-up type doors, panel doors, structural walls or dividers, thermal barriers and the like. FIG. 1D is a side view of FIG. 1A. FIG. 1C is an exploded view of a section of FIG. 1D.

The composite material 100 may be configured in nearly any flat shape. However, in the example as shown in FIG. 1, the composite material 100 may have a first length 115. A second length 120 may include the composite material height 120 plus an additional length 145 that comprises an extension only of the belting material 125 (FIG. 1B), described in more detail below. The composite material 100 may have a width 110. The composite material 100 may have a characteristic of being rollable (i.e., being rolled into a spiral) in a first direction 122, while being resistant to being rollable in a second direction, such as direction 105 as illustrated. The composite material 100 may be configured to generally resistant to rolling in the width 110 direction, while having a characteristic of being rollable in the direction of the length 115, denoted by arrow 122.

Figure 1B:
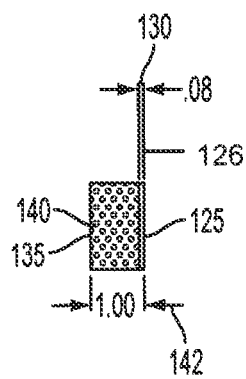
FIG. 1B is an exploded cross-sectional view of the composite material of FIG. 1A taken along the line 1B-1B.
Figure 1C:
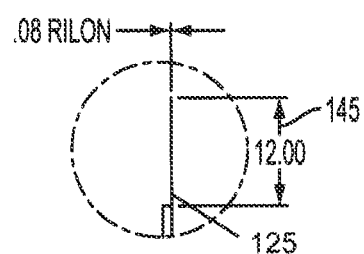
FIG. 1C is an exploded view of a section of FIG. 1D.

FIG. 1B is an exploded cross-sectional view of the composite material 100 of FIG. 1A taken along the line 1B-1B. The composite material 100 may comprise at least three layers. A first layer 125 (or first outer layer) may comprise a structural layer or belting material layer which is of a highly durable and strong material while being sufficiently flexible to permit rolling of the material into a spiral (or coiled) configuration. The belting material may be analogous to material used in a tread mill exercise machine, for example. The first layer 125 may range in thickness 130 of not less than about 0.03" and not greater than about 0.25". A preferred range may range from about 0.03" to about 0.09". The first layer 125 may comprise a material comprising at least one of: polyurethane, rubber, and polyvinylchloride. The first layer 125 may also include a fiber mesh core 126. The first layer 125 material composition is configured to resist stretching significantly, resist compressing a significant amount, while maintaining a liner dimension within about 1% of the total length when alternating from the spiral to flat position.

The first layer 125 may be generally referred to as the cold-sided layer and typically rolls to the outside and comprises a generally non-compressible, non-elastic durable material. This first layer 125 ensures that when a panel of composite material 100 rolls (from a flat orientation to a rolled or coiled configuration), the closed cell foam material (i.e., the second layer 135), which is on the inside of the roll, only needs to compress in-place. With this configuration, the second layer 135 does not have to stretch horizontally, which is an advantage as most foam does not stretch very well, and will eventually tear or break down if forced to stretch.

The second layer 135 which may be an inner layer or center material layer may comprise a substantial insulating composition such as polyolefin, polyurethane or rubber, based foam. In the example of FIG. 1B, the second layer 135 is shown as, but not limited to, 2 lb. density closed cell polyethylene copolymer cross-linked foam.

The third layer 140 may comprise a thin film or fabric. The thickness of this layer may be less than about 25 mil and greater than about 2 mil. The material of the third layer 140 may comprise polyester, polyether, polyolefin, polyurethane, nylon, or the like. Moreover, it may be any combination of these materials.

The first layer 125, second layer 135, and third layer 140 may be bonded to respective adjacent layers to form the permanently bonded single composite material 100. The technique of bonding of the respective adjacent layers may include a bonding layer therebetween. This may include an acrylic based adhesive, heat fusion, or both an acrylic based adhesive and heat fusion. There may be no horizontally running seams or channels (such as in the direction 105) on a panel of composite material 100. All layers 125, 135 and 140 are continuous in the direction of rolling 122.

The composite material 100 may be configured to provide a thermal insulating rating of greater than R=3 (K<0.333). The composite material 100 may be constructed in an asymmetric configuration as shown in FIG. 1B with a structural thickness.

The composite material 100 may be cut to specific sizes depending on applications, to form specific shaped and sized panels or forms. As shown in FIG. 1B, the width 142 of the composite material 100 may be about 1 inch, but other widths may be achieved.

As shown in FIG. 1C, the first layer 125 may include a segment 145 that extends beyond the second 135 and third layer 140. The segment 145 of the first layer 125 may be any practical length, such as the illustrative 12" shown in FIG.

1C. The segment 145 may be used to secure a panel of composite material when installed. For example, the segment 145 may be attached to a rolling drum located atop a doorway or passageway. The drum may be operated to cause coiling/rolling/unrolling of the panel when closing or opening a doorway passageway.

Figure 2:
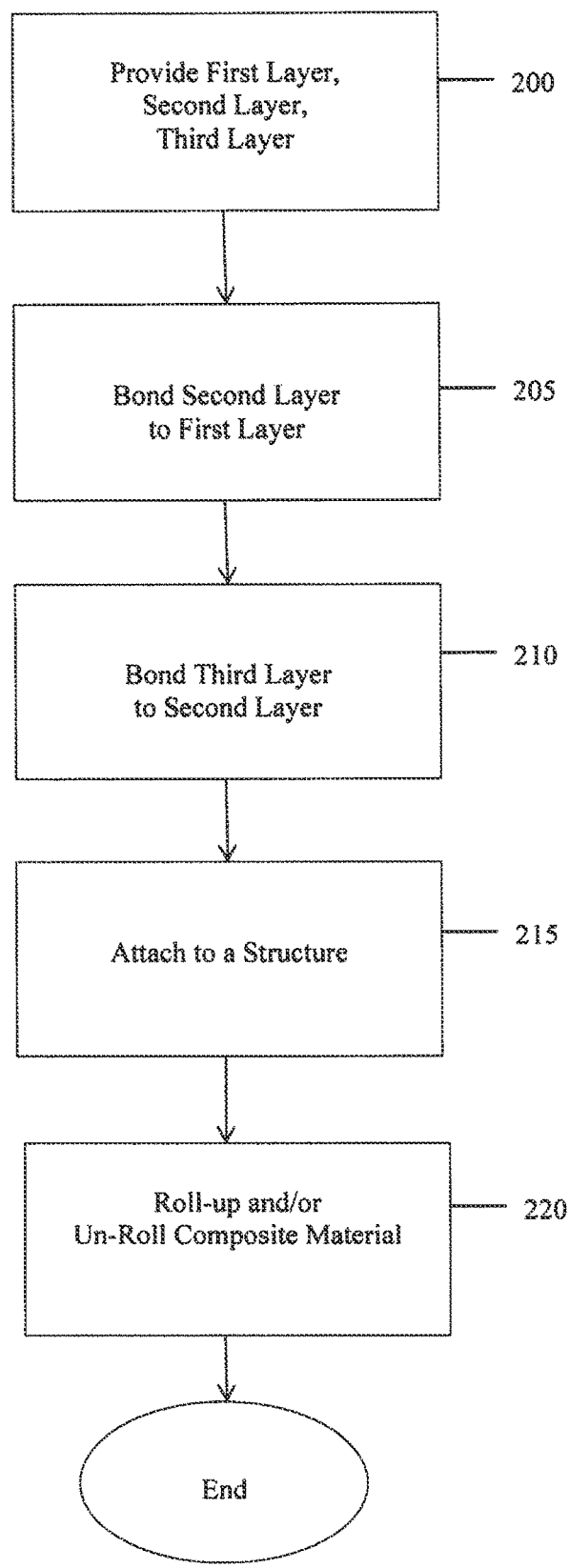
FIG. 2 is a flow diagram showing an example of a process for forming a thermal barrier, the steps of the process performed according to principles of the disclosure.

FIG. 2 is a flow diagram showing an example of a process for forming a thermal barrier, the steps of the process performed according to principles of the disclosure. The process of FIG. 2 may form the thermal barrier composite material of FIGS. 1A-1D.

At step 200, a first layer, e.g. first layer 125 may be provided that may comprise a generally non-compressible, non-elastic durable material. The first layer may be configured to resist stretching significantly, resist compressing a significant amount, while maintaining a liner dimension within about 1% of the total length when alternating from the spiral to flat position. The first layer may be configured to be longer than the second layer and third layer for assisting in installation. A second layer, e.g. second layer 135, may be provided and may be an inner layer or center material layer that may comprise a substantial insulating composition such as polyolefin, polyurethane or rubber, based foam. In some applications, the second layer may comprise about a 2-lb. density closed cell polyethylene copolymer cross-linked foam. A third layer may be provided. The third layer, e.g., layer 140, may comprise a thin film or fabric. The thickness of this third layer may be less than about 25 mil and greater than about 2 mil.

At step 205, the first layer, e.g., layer 125 may be bonded to the second layer, e.g., layer 135, to form a two-layer composite material, for creating a thermal barrier. At step 210, the third layer, e.g., layer 140, may be bonded to the second layer, forming a three-layer composite material for forming a thermal barrier.

The technique of bonding of the respective adjacent layers may include a bonding layer therebetween. This may include an acrylic based adhesive, heat fusion, or both an acrylic based adhesive and heat fusion.

In one aspect, there may be no horizontally running seams or channels (such as in the direction 105) on a panel of produced composite material. All layers, e.g., layers 125, 135 and 140 are continuous in the direction of rolling.

At step 215, the composite material may be attached to a structure (e.g., attached to a rolling drum located above a doorway or passageway) for creating a vertical thermal barrier (or possibly, to create a horizontal barrier in certain applications). The composite material may be shaped to a size suitable for a particular installation, such as a particular size of a wall opening. At step 220 the composite material when installed may be rolled-up or unrolled as required for a particular application.

While the invention has been described in terms of examples, those skilled in the art will recognize that the invention can be practiced with modifications in the spirit and scope of the appended claims. These examples are merely illustrative and are not meant to be an exhaustive list of all possible designs, embodiments, applications or modifications of the invention.

What is claimed is:

1. A composite material comprising:
    a first layer comprising a fiber mesh core and material comprising at least one of: polyurethane, rubber, and polyvinylchloride;
    a second layer bonded to the first layer, the second layer comprising at least one of: polyolefin foam, polyurethane foam and rubber based foam; and
    a third layer bonded to the second layer, the third layer comprising a thin film or fabric material comprising at least one of: polyester, polyolefin and nylon,
    wherein the first layer includes a first segment, the first segment extending beyond the length of any bonded portions of the first layer, second layer, and third layer in a linear direction, and
    further wherein the composite material provides an insulating value of greater than R=3.

2. The composite material of claim 1, wherein the first layer is bonded to the second layer by acrylic based adhesive, heated fusion, or both.

3. The composite material of claim 1, wherein the second layer is bonded to the third layer by acrylic based adhesive, heated fusion, or both.

4. The composite material of claim 1, wherein the first layer has a thickness of greater than about 0.03" and less than about 0.25".

5. The composite material of claim 1, wherein the third layer has a thickness less than about 25 mil and greater than about 2 mil.

6. The composite material of claim 1, wherein the composite material has no seams in a first direction.

7. The composite material of claim 6, wherein the first direction is horizontal when installed.

8. The composite material of claim 6, wherein the composite material has no ridges or valleys in the surface that run in the first direction.

9. The composite material of claim 1, wherein the composite material is seamless and continuous.

10. A method of forming a thermal barrier, the method comprising the steps of:
    providing a first layer comprising a fiber mesh core and material comprising at least one of: polyurethane, rubber, polyvinylchloride and polyurethane;
    bonding a second layer to the first layer, the second layer comprising material comprising at least one of: polyolefin foam, polyurethane foam and rubber based foam; and
    bonding a third layer to the second layer producing a composite material, the third layer comprising a thin film or fabric material comprising at least one of: polyester, polyolefin and nylon,
    wherein the first layer includes a segment which extends beyond the length of the composite material and the composite material provides an insulating value of greater than R=3.

11. The method of claim 10, further comprising attaching the composite material to a structure to form a thermal barrier.

12. The method of claim 11, further comprising rolling up the composite material.

13. A composite material comprising:
    a first layer comprising a fiber mesh core and material comprising at least one of: polyurethane, rubber, and polyvinylchloride;
    a second layer bonded to the first layer, the second layer comprising at least one of: polyolefin foam, polyurethane foam and rubber based foam; and
    a third layer bonded to the second layer, the third layer comprising a thin film or fabric material comprising at least one of: polyester, polyolefin and nylon,
    wherein the first layer includes a first segment, the first segment extending beyond the length of any bonded portions of the first layer, second layer, and third layer in the linear direction, and the first layer has a thickness of greater than about 0.03" and less than about 0.25".

14. The composite material of claim 13, wherein the third layer has a thickness less than about 25 mil and greater than about 2 mil.

15. The composite material of claim 13, wherein the composite material is seamless and continuous.

16. A composite material comprising:
- a first layer comprising a fiber mesh core and material comprising at least one of: polyurethane, rubber, and polyvinylchloride;
- a second layer bonded to the first layer, the second layer comprising at least one of: polyolefin foam, polyurethane foam and rubber based foam; and
- a third layer bonded to the second layer, the third layer comprising a thin film or fabric material comprising at least one of: polyester, polyolefin and nylon,
- wherein the first layer includes a first segment, the first segment extending beyond the length of any bonded portions of the first layer, second layer, and third layer in the linear direction, and the third layer has a thickness less than about 25 mil and greater than about 2 mil.

\* \* \* \* \*